United States Patent [19]
Gee

[11] Patent Number: 5,205,622
[45] Date of Patent: Apr. 27, 1993

[54] VEHICULAR TRACTION CONTROL SYSTEM

[75] Inventor: Thomas A. Gee, Allen Park, Mich.

[73] Assignee: Eaton Corporation, Cleveland, Ohio

[21] Appl. No.: 652,735

[22] Filed: Feb. 8, 1991

[51] Int. Cl.⁵ ............................................. B60T 8/32
[52] U.S. Cl. ........................... 303/113.2; 364/426.03; 303/112; 303/113.5
[58] Field of Search ...... 303/113 R, 113 TR, 113 SS, 303/113 AP, 112, DIG. 3; 364/426.03; 180/197

[56] References Cited

U.S. PATENT DOCUMENTS

| | | | |
|---|---|---|---|
| 4,521,856 | 6/1985 | Phelps et al. | 364/426.03 |
| 4,714,299 | 12/1987 | Takata et al. | 303/113 AP |
| 4,724,935 | 2/1988 | Roper et al. | 180/244 |
| 4,745,552 | 5/1988 | Phelps et al. | 364/426.03 |
| 4,750,125 | 6/1988 | Leppek et al. | 364/426.03 |
| 4,811,993 | 3/1989 | Matsumoto et al. | 303/112 |
| 4,823,269 | 4/1989 | Fujioka et al. | 364/426.03 |

Primary Examiner—Joseph F. Peters, Jr.
Assistant Examiner—Anne E. Bidwell
Attorney, Agent, or Firm—H. D. Gordon

[57] ABSTRACT

A vehicular traction control system (10) is provided wherein the foundation brakes (40, 42) associated with an excessively spinning wheel (28, 30) are applied, the braking torque required to terminate the excessive spinning is determined, the brakes are released and if the spin-out reoccurs, the brakes are rapidly reapplied with a braking torque just insufficient to have previously caused the excessively spinning wheel to be substantially stopped.

5 Claims, 4 Drawing Sheets

VEHICULAR TRACTION CONTROL SYSTEM

BACKGROUND OF THE INVENTION

1. Field of the Invention

The present invention relates to a vehicular traction control system and in particular to a vehicular traction control system for a vehicle having first and second drive wheels driven through a common, open differential and first and second independently controllable foundation brakes for selectively independently retarding the rotational velocity of the first and second drive wheels, respectively.

2. Description of the Prior Art

The use of vehicular drive axles wherein a first and second (i.e. right and left) driven wheel are driven through an open differential is, of course, well known in the prior art. Examples of such drive axles may be seen by reference to U.S. Pat. Nos. 4,050,534; 4,018,097; and 4,651,587, the disclosures of which are incorporated herein by reference.

While such drive axles are very successful commercially and widely used in view of their economy, simplicity, desirability and ability to minimize wear on tires and the like, they are not totally satisfactory if one of the wheels is on a relatively low friction surface such as ice, loose gravel or the like. In such situations, as is well known, the wheel/tire on the low friction surface will spin, the open differential will divide drive torque equally and, thus the other wheel/tire will be provided with only the relatively low amount of torque developed by the spinning wheel.

To minimize the loss of driving torque experienced by an open differential drive axle in such "split friction surface" situations, various full or part time biased differentials of the "limited slip" or "locking" type are used. Examples of these types of devices may be seen by reference to U.S. Pat. Nos. 4,598,609; 4,569,250; 4,263,824 and 3,916,728, the disclosures of which are hereby incorporated herein by reference. While these modified differentials are effective to minimize loss of driving torque in split friction surface situations, they are not totally satisfactory as they are relatively complicated and/or expensive to provide, install and/or maintain; they tend to wear more rapidly than an open differential; they tend to cause drive shafts, axle shafts and tires to be exposed to increased wear and/or they require complicated and/or expensive controls for the automatic and/or manual operation thereof.

More recently, traction control systems have been proposed, usually in connection with vehicles equipped with an antilock brake system ("ABS"), wherein, if a wheel spin-out is sensed, the foundation brakes for that wheel are applied to stop the wheel and to allow an additional amount of torque generally equal to the braking torque to be supplied by the open differential to the other wheel. In certain of these systems, the torque output of the vehicle engine is also monitored and controlled. An example of a prior art vehicular traction control system may be seen by reference to U.S. Pat. No. 4,946,015, the disclosure of which is hereby incorporated herein by reference.

The prior art traction control systems were not totally satisfactory as the required sensors, logic units and actuators for monitoring and controlling engine torque may be complicated and/or expensive to provide and maintain and locking of the spinning wheel, often with an unnecessarily large braking torque, often resulted in causing the other wheel to spin as, especially in a heavy duty vehicle, the vehicular engine can provide sufficient torque to spin a single wheel on most, if not all, friction surfaces. Locking of the previously spinning wheel causes a significant vehicular drag and also wear on the wheel and brakes. Such a drag will increase the tendency of the other wheel to break loose and spin out. Further, it will result in unpleasantly rapid cycling and the requirement to dump and then rebuild air pressure as unlimited amounts of pressurized air are not available. Loss of pressurized air limits the traction control system capacity and may adversely effect the vehicle braking system. Also, it is likely that cycling will excite a natural frequency of the driveline and cause large stresses which may damage driveline components.

SUMMARY OF THE INVENTION

In accordance with the present invention, the drawbacks of the prior art are overcome or minimized by a vehicle traction control system not requiring monitoring or controlling of engine torque and which will allow only a predetermined braking torque to be applied to the spinning wheel to limit the torque applied to the other wheel to minimize the probability of causing that other wheel to also spin out and also to minimize the possibility of locking the spinning wheel and causing an undesirable drag. The present invention will also minimize the consumption of stored pressurized air and reduce undesirable drive line component stress.

According to the present invention, the desirable initial braking torque applied to the spinning wheel is somewhat less than the amount of braking torque required to slow down or stop the spinning wheel. This amount of braking torque, at a given engine output, is the total torque required to slow/stop the wheel minus the resistance torque from the road surface and thus is a function of the friction characteristics of the surface under the slipping wheel, which is, most probably, similar to (but of a lower frictional value than) the frictional characteristics of the surface under the other wheel.

As, in practice, the amount of brake torque just insufficient to cause the spinning wheel to lock-up is difficult or impossible to determine, the brakes of the spinning wheel are applied and a parameter indicative of brake torque, such as apply pressure, actuator displacement or the like, is measured and/or simulated. At the instant of incipient or actual stopping of the spinning wheel, i.e. when rotational velocity becomes less than a reference value and/or rotational deceleration exceeds a reference value, the value of the parameter is memorized and the brake released. If the initial application of the brakes was not sufficient to allow the vehicle to move off, the wheel will again spin out. At this time, the brake associated with the spinning wheel is reapplied to a point wherein the reapplication parameter equals less than the memorized initial value. Preferably, the reapplication parameter will be derived as the memorized parameter value minus a parameter decrement where the parameter decrement is a function of the time required for the measured value of the parameter to equal or exceed the current decremented value and is thus adaptive to system responsiveness. The brakes may be held at this value, or, preferably, may be ramped upwardly. If spinout of either wheel occurs, the brakes are released and then reapplied at an again decremented parameter value. When the wheels are rotating at a substantially equal speed above a minimum value, and/or for a given time then the entire logic is reset to its default or initial condition wherein a first cycle of a new spin-out event is awaited.

Accordingly, it is an object of the present invention to provide a new and improved vehicular traction control system which does not require sensing or controlling engine torque and which will tend to minimize locking up of a previously spinning wheel and induced wheel spin of the other wheel.

This and other objects and advantages of the present invention will be appreciated in greater detail by reference to the description of the preferred embodiment taken with the drawings.

DESCRIPTION OF THE PREFERRED EMBODIMENT

Figure 1:
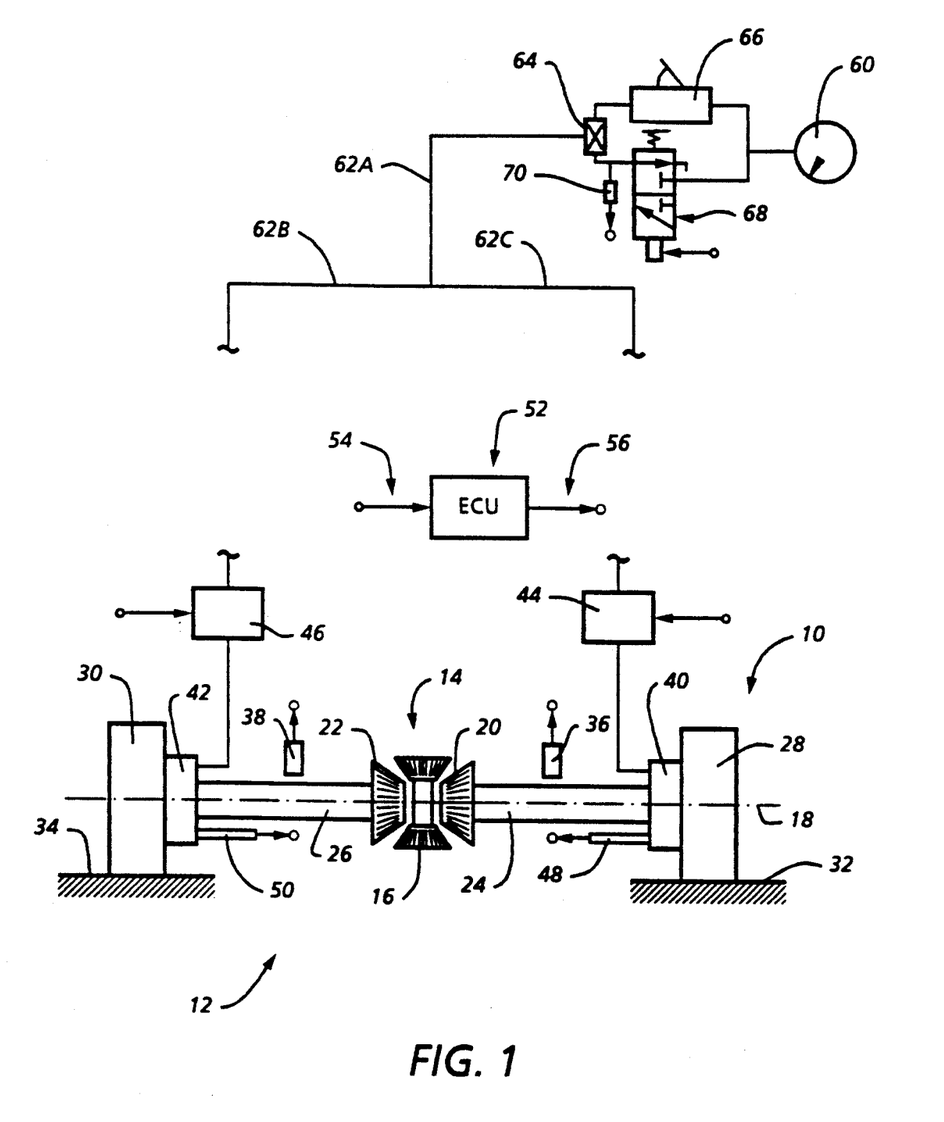
FIG. 1 is a schematic illustration of a typical vehicular drive axle and the vehicular traction control system of the present invention.

In FIG. 1, the vehicular traction control system 10 of the present invention is schematically illustrated as utilized with a vehicle having a typical drive axle assembly 12. Drive axle assembly 12 includes an open differential 14 comprising a plurality of differential pinion gears 16 rotatably driven about an axis of rotation 18 by a vehicular drive train typically comprising an engine (not shown), a change gear transmission (not shown) and a drive shaft (not shown). The differential pinions 16 are engaged with and drive a pair of differential side gears 20 and 22 which are fixed for rotational with axle shafts 24 and 26, respectively, to rotate the driven wheels 28 and 30, respectively. Vehicular drive axle assemblies of this type are well known in the prior art and may be seen by reference to above-mentioned U.S. Pat. Nos. 4,050,534; 4,018,097; and 4,651,587.

As is well known for drive axle assemblies utilizing open differentials, i.e. not of the biased, limited slip or the locking type, the open bevel gear differential 14 will divide available drive torque equally between the driven wheels 28 and 30 such that the maximum torque available in either wheel 28 or wheel 30 will be equal to one-half of the available torque from the engine. The torque available from the engine is a function of operator's initiative, engine speed, governing devices and engine and driveline efficiency. Accordingly, if the surface 32 under wheel 28 is of an extremely low friction characteristic and of a lesser friction characteristic than the surface 34 under wheel 30, such as glare ice or the like, wheel 28 will be caused to slip on surface 32 at at extremely low value of drive torque and an application of greater drive torque by the engine will simply result in faster spinning of the wheel 28 on surface 32 while the torque available to drive wheel 30 on surface 34, regardless of the friction characteristics of surface 34, will be limited to that torque required to initially cause and/or maintain wheel 28 to slip on surface 32.

The above condition is commonly referred to as a "wheel spin" or "spin-out" condition. In automotive vehicles equipped with open differential drive axles, including heavy duty vehicles such as heavy trucks and tractor/semi-trailer vehicles, it is a common experience, especially at vehicle start-from-stop operation, for excessive wheel spin to occur when the operator initiated engine torque delivered to the vehicle driven wheels is such that the frictional forces between the tires and the road surfaces are overcome. While a relatively small amount of slippage between the vehicle tires and the road surface is necessary in order to achieve a driving force, excessive wheel spin results in a reduction of effective driving force and concurrently in the deterioration in the lateral stability of the vehicle.

In a split friction surface situation, i.e. the friction surface 32 under the righthand tire 28 is significantly different from the friction surface 34 under the lefthand tire 30, this is an especially undesirable situation as the vehicle is unable to make use of the motivating force available at the wheel on the higher friction surface.

As is known, the disadvantages of excessive wheel spin or spin-out in a split friction surface situation may be minimized by the utilization of various types of biased, limited slip and/or locking differential devices. Devices of this type, examples of which may be seen by reference to above-mentioned U.S. Pat. Nos. 4,598,609; 4,569,250; 4,263,824 and 3,916,728, are not suitable for all situations as they may be relatively expensive to provide and maintain, and may cause increased wear on various drive train components and/or they may require expensive and/or complicated manual and/or automatic controls.

Vehicular traction control systems, usually for vehicles equipped with an ABS, have been proposed for preventing an excessive spinning condition of one of the driven wheels of a vehicle by applying the foundation brakes of that wheel. Certain of these systems have also included means to monitor and/or control the amount of driving torque provided by the engine to further control or prevent excessive wheel spin. An example of a prior art vehicular traction control system may be seen by reference to above-mentioned U.S. Pat. No. 4,946,015. The prior art vehicular traction control systems were not totally satisfactory as relatively complicated and/or expensive engine monitoring and control means were required and/or the systems operated to lock up the spinning wheel, thus creating an undesirable amount of drag to be overcome by the other wheel, creating an undesirable amount of wear at the locked up wheel assembly and often causing a situation which tended to create a wheel spin situation at the other wheel. Also, rapid cycling of the vehicle brakes between a pressurize and exhaust mode will tend to quickly deplete the vehicles stored supply of pressurized air.

The vehicular traction control system 10 of the present invention includes a first and second wheel speed sensor, 36 and 38, for providing signals indicative of the rotational speed of wheels 28 and 30, respectively. Wheel speed sensors of this type are well known in the prior art and may be the wheel speed sensors utilized for a wheel-by-wheel ABS system. Examples of wheel speed sensors may be seen by reference to U.S. Pat. Nos. 4,937,522; 4,862,028 and 4,200,816 the disclosures of which are incorporated herein by reference. Each of the wheels 28 and 30, respectively, is provided with a foundation brake, 40 and 42, respectively, for selectively retarding the rotational speed of the wheels, each of which foundation brakes is individually releaseable by an individually operated control member, 44 and 46, respectively. The control members 44 and 46 may be any one of a variety of well-known brake relay and/or ABS type valves.

Preferably, the control members will have means, such as variable apertures and/or pulse width modulating, allowing the pressure applied to the brakes to be increased at either a rapid or a slow (ramped) rate to the available maximum system pressure. Valves of this type are, of course, well known. Each of the brakes, 40 and 42, is provided with a brake control parameter sensor, 48 and 50, respectively, for sensing the value of a parameter indicative of the force or torque with which the brake is applied and for providing an output signal indicatively thereof. Typically, in a heavy duty truck utilizing air brakes, the monitored brake control parameter is air pressure. Examples of brake control valves and brake control parameter value sensing devices may be seen by reference to U.S. Pat. Nos. 4,818,035; 4,804,237; 4,768,840; 4,749,063; 4,168,866; and 4,134,621 the disclosures of which are incorporated herein by reference.

Upstream of the controllers 44 and 46, a source of pressurized fluid 60, such as an air compressor and/or wet tank, supplies pressurized fluid to conduits 62A, 62B and 62C through a double check valve 64. One inlet to double check valve 64 is controlled by a standard treadle valve 66 while the other inlet is connected to a three-way solenoid valve 68 which can pressurize conduits 62A-C independently of the operation of the brake treadle valve 66. A sensor 70 may be provided for sensing pressure at the outlet of the valve 68.

The vehicular traction control system 10 also includes a control unit 52, preferably a microprocessor based electronic control unit, having input circuitry 54 for receiving input signals from the speed sensors 36 and 38 and the brake control parameter sensors 48 and 50 and pressure sensor 70 and output circuitry 56 for issuing command output signals to the brake controllers 44 and 46 and the solenoid valve 68. Electronic control unit 52 may be of any known type and typically processes the input signals in accordance with predetermined logic rules to issue command output signals. Examples of such microprocessor based control units may be seen by reference to U.S. Pat. Nos. 4,595,986; 4,724,935; 4,724,935 and 4,917,443, the disclosures of all of which are hereby incorporated by reference.

Figure 2:
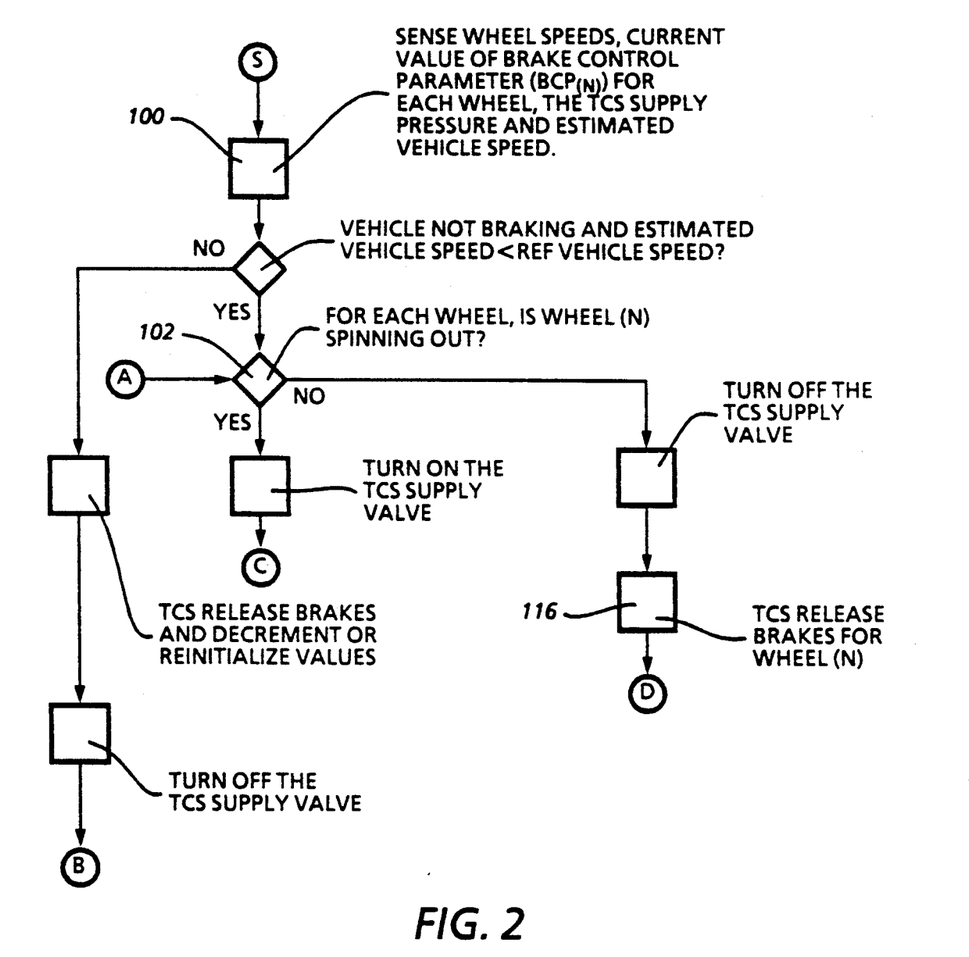
FIGS. 2 and 2A are a schematic illustration, in flow chart format, of the operation of the vehicular traction control system of the present invention.
Figure 2A:
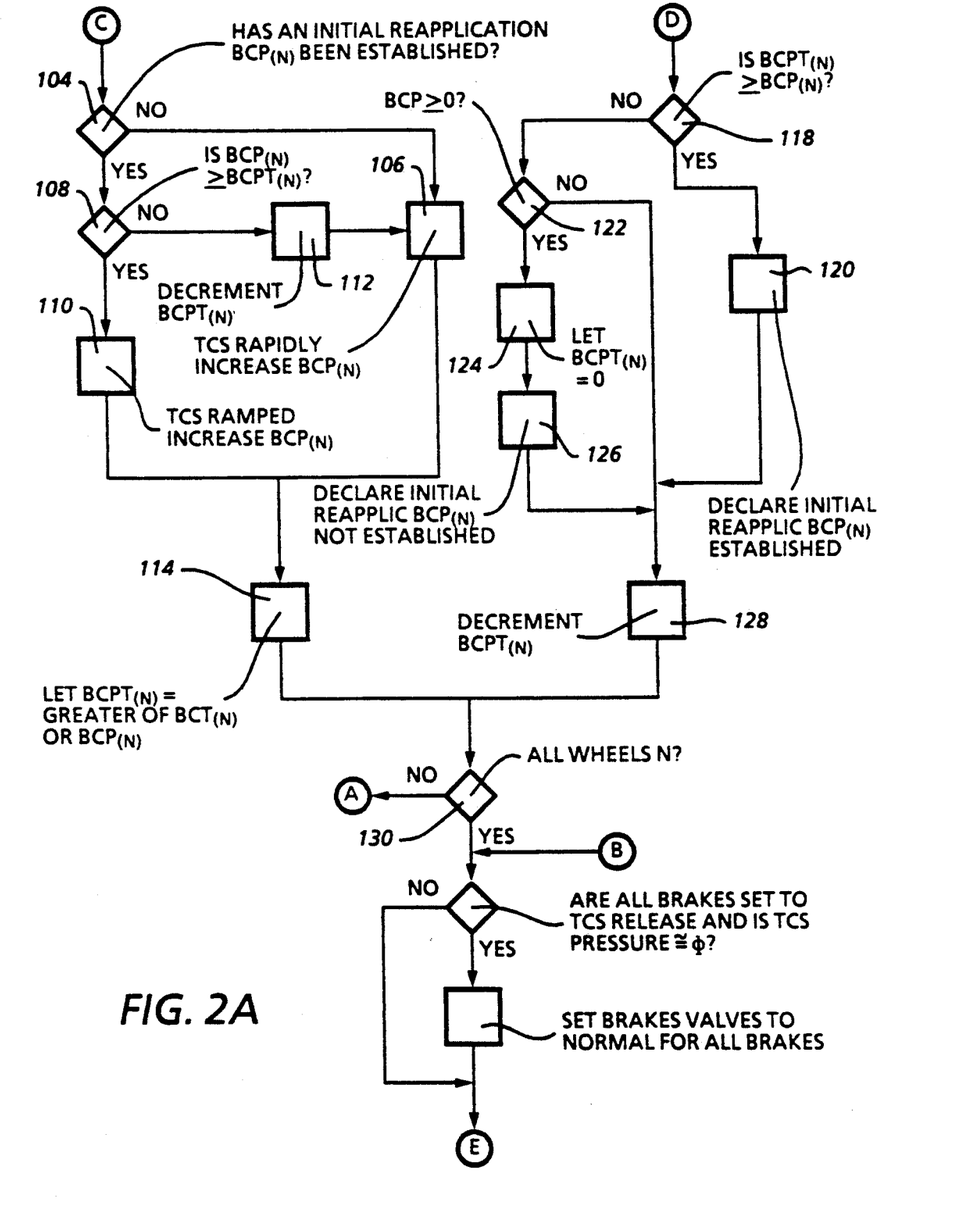

An example of logic for the operation of the vehicular traction control system 10 of the present invention is schematically illustrated, in flow chart format, in FIG. 2. Briefly, the ECU 52 receives input signals from the wheel speed sensors 36 and 38, brake control parameter sensors 48 and 50 and pressure sensor 70 and determines if a wheel spin-out condition exists. Briefly, a wheel spin-out condition will be declared if the rotational velocity and/or acceleration of a wheel exceeds a predetermined reference and/or if the difference in rotational speeds between wheel 28 and wheel 30 exceeds a predetermined reference.

If a spin-out condition is sensed, the ECU 52 will issue command output signals to the valve 68 and to the controllers 44 and 46. Briefly, valve 68 will be actuated to pressurize conduits 62A-C, and the brake comtroller, 44 or 46, associated with the nonexcessively spinning wheel will be in the brake release position causing only the foundation brakes, 40 or 42, associated with that excessively spinning wheel to be applied. Meanwhile, the output from the brake control parameter sensors, 48 and 50, is monitored by the ECU. Preferably, if an initial reapplication pressure has been established, the pressure will be increased rapidly if sensed pressure is below a target value and will be ramped up slowly if sensed pressure exceeds the target value.

The above will continue until the angular velocity of the excessively spinning wheel is less than a predetermined reference value. When the angular velocity of the spinning wheel is less than the predetermined reference value the brakes associated with the previously spinning wheel are released. Alternatively, the angular deceleration of the previously spinning wheel may be monitored to determine if that wheel is stopped or is stopping.

An initial reapplication pressure is established only if a spin-out condition has been sensed and the spinning wheel has been caused to stop excessive spinning or at least decelerate by the application of a selected vehicle brake at a monitor value of a brake control parameter ($BCP_{(N)}$). The value of the brake control parameter sufficient to cause the cessation of a spin-out condition of a previously spinning wheel is then decremented to arrive at a target parameter value ($BCPT_{(N)}$). Thereafter, depending upon road surface conditions and responsiveness of the vehicle brake system current target pressure values will be established as will be described in greater detail below.

Referring to the vehicular traction control system logic subroutine of the present invention as schematically illustrated in FIG. 2, the traction control subroutine will not be implemented if the operator has initiated a vehicle braking operation and/or if the vehicle has a ground speed exceeding a predetermined value. As may be seen at logic blocks 100 and 102, the ECU 52 receives input signals from the wheel speed sensors 36 and 38 and from the brake control parameter sensors 48 and 50 and determines if a wheel spin condition exists at any one of the monitored wheels. As indicated previously, the wheel spin-out condition will be declared if the rotational velocity and/or acceleration of a monitored vehicular wheel exceeds a predetermined reference and/or if the difference in rotational speeds between wheels exceeds a predetermined reference.

If a spin-out condition is sensed, the ECU 52 will determine if an initial reapplication target pressure has been established as may be seen in logic block 104. If an initial target value has not been established, the ECU will cause the traction control system valves to increase the brake control parameter, usually air pressure, rapidly as may be seen at logic block 106. If an initial reapplication target value has been established, the current value of the brake control parameter ($BCP_{(N)}$) is compared to the current target value for the brake control parameter ($BCPT_{(N)}$). If the current value of the brake control parameter exceeds the target value, the traction control system valves are set to increase the control parameter at a ramped or reduced rate as may be seen at logic blocks 108 and 110. If the current value of the brake control parameter ($BCP_{(N)}$) does not exceed the current target value ($BCPT_{(N)}$), the current target value ($BCPT_{(N)}$) is decremented as may be seen at logic block 112 and the traction control system valves are set to increase the brake control parameter rapidly as at logic block 106.

The decrementing of the current brake control parameter target value ($BCPT_{(N)}$) occurring at logic block 112 occurs as a failure of the current brake control parameter to exceed the current target value is an indication of lower responsiveness of the system. Upon leaving either logic block 110 or logic block 106, a revised value of the brake control parameter target value ($BCPT_{(N)}$) is set which will equal, the greater of previous target value or the current measured value of the brake control parameter as may be seen by reference to logic block 114.

If a wheel spin-out is not sensed, the traction control system valves are set to release traction control system pressure as may be seen by reference to logic block 116. In practice, the traction control valve 68 is set to exhaust the conduits 62A-C and the ABS valves 46 and 48 are retained in their current position until such time as pressure transducer 70 indicates that the conduits have been vented to prevent residual pressure in the conduit from exerting a torque spike on the wheels as the control valves 44 and 46 are returned to their normal or nonblocking condition. The ECU will then determine if the target pressure ($BCPT_{(N)}$) is greater than the actual pressure ($BCP_{(N)}$) as may be seen by reference to logic block 118. If the target pressure is greater than the actual pressure, this is an indication that a wheel spin-out has been sensed, that the brake control parameter has been increased and, that as a result of such increase at brake control parameter, the spin out condition has been terminated, all of which is an indication that an initial reapplication pressure has been established as may be seen by reference to logic block 120.

If the target brake control parameter ($BCPT_{(N)}$) does not exceed the existing brake control parameter ($BCP_{(N)}$) the system then determines if the target brake control parameter is less than zero as may be seen in reference 122 and if it is less than zero the value of the target is reset to zero as may be seen by reference to logic lock 124. If the brake control parameter is less than zero this indicates that during the previous cycle of the subroutine a spin-out condition did not exist and that an initial brake control parameter target value has not been established as may be seen by reference to logic block 126.

Regardless of the relative values of the target brake control parameter and the measured brake control parameter, for every cycle through the loop that a brake spin-out is not sensed, the target brake control parameter is decremented as may be seen by reference to logic block 128.

The system will then check to determine if the above logic has been applied to each of the monitored system wheels. If the logic has been applied to all the wheels, the logic subroutine is exited to be reentered on a timely basis upon the next pass through the total ECU system logic. If the traction control system subroutine logic has not been applied to all the wheels, the logic loop will be reentered for the next sequential wheel, see logic block 130.

Traversing the traction control system logic path when no spin-out is present causes a decrement of the reapplication parameter at logic block 128. The detriment can be a simple fixed value and because the logic is traversed on a timely basis such a fixed decrement will cause a time linear decay of the target reapplication parameter. Generally, the value of the decrement is "tuned" to create a decay rate of about 1/10th or so of the rate of the monitored parameter. The use of a time decayed reapplication variable is useful as it tends to complement the traction control system elements of the brake system behavior that adversely impact traction control system performance, i.e., a very low hysteresis brake system can be cycled faster with much less air consumption than a slow one or an overshooting ABS valve will require a lower reapplication pressure to compensate for the overshoot.

It is noted that at such time as the vehicle is moving at at least a predetermined speed, i.e., the rotational velocity of the wheels is substantially equal and equal to or greater than a reference value, ECU will not traverse the traction control system subroutine logic.

Referring to logic block 116, if the release of the brake pressure has existed for a sufficient time, the memorized parameter value, BCPT will be greater than the naturally faster decaying BCP(N). It can be seen that the BCPT or target value is basically the value of the brake control parameter that existed on the brakes when the spin-out ceased. This condition is used in logic block 120 to declare that a value has been memorized. Of course, if the cessation of spin-out is very long, the BCPT value will decay to a very low value. For such an event the declaration is voided in logic block 126. However, when the declaration is valid, and the wheel again spins out because of the low traction, the logic is traversed in a manner to decrease the value of the target brake control parameter. Note that until the brake control parameter reaches the target reapplication parameter, the latter continues to decay due to the logic block 112. When the brake parameter does reach the reapplication parameter, the traction control system valve condition is changed as at logic block 110 to cause the brake control parameter to hold and to then increase at a relatively low or ramped rate. This assures that if the existing drive torque established by applying the target brake control parameter is insufficient to cause the vehicle to move off and is also insufficient to cause the other wheel to spin out that the brake control parameter and thus the torque created at the previously spinning wheel are gradually increased.

The advantage of system 10 operating with software and firmware in its controller 52 as illustrated in FIG. 2 is that the foundation brakes associated with the excessively spinning wheel are initially applied with a force/torque slightly less than the force/torque required to lock up the wheel whereby the other wheel will be provided with that amount of torque to motivate the vehicle while not creating a drag on the previously spinning wheel which will tend to make motivation of the vehicle more difficult and/or tend to create a spinning of the other wheel. Also, if sufficient torque were applied to the excessively spinning wheel to lock up that wheel, substantially all the torque available from the vehicle drive train would be applied to the other wheel, which wheel is probably on a surface of relatively similar frictional characteristics as the previously spinning wheel, which would certainly tend to cause the other wheel to spin out.

Figure 3:
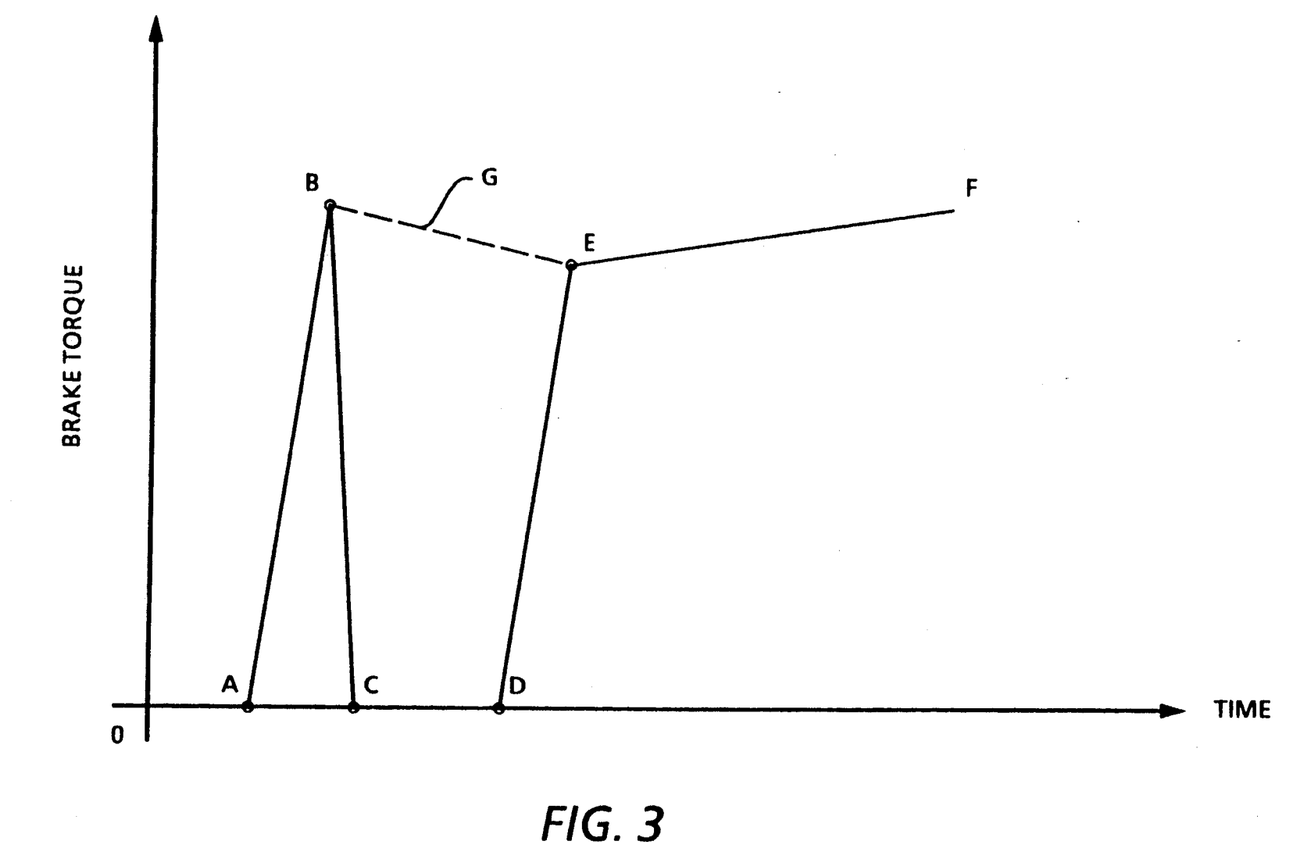
FIG. 3 is a graphical representation of the operation of the traction control system of the present invention.

An example of the operation of the traction control logic of the present invention may be seen by reference to FIG. 3.

At point A a wheel spin-out is sensed and braking torque is increased at the rapid full fill of brake valves to point B where spin-out is sensed as ceasing. The brakes are then released from point B to point C. At point B, an initial reapplication is established and a decrementing target value of brake torque is defined (see line G).

If the wheel spins out against, as at point D, the brakes are rapidly applied to point E, where the actual torque (or brake control parameter indicative of torque) equals to decrementing target value and then brake torque is applied at the reduced rate, see line E-F.

Brake control parameter sensors 48 and 50 may be eliminated and the force/torque applied at the foundation brake associated with the excessively spinning wheel may be a simulated/calculated value based upon other sensed conditions such as length of time of brake valve states, time derivatives of sensed wheel speed and the like. Systems for simulating/calculating a control parameter are known in the prior art as may be seen by reference to U.S. Pat. No. 4,576,263, the disclosure of which is hereby incorporated by reference.

Also, if the vehicle is equipped with tandem axles driven by an interaxle differential, the traction control system will preferably lock or bias the interaxle differential upon sensing a spin-out and maintain the interaxle differential locked or biased until a vehicle move off is sensed. Tandem axles and locking interaxle differentials are well known in the prior art as may be seen by reference to U.S. Pat. Nos. 3,929,200 and 4,050,534 the disclosure of which is incorporated by reference.

Accordingly, it may be seen that a traction control system/method has been provided not requiring monitoring and/or controlling of supplied engine torque and which is effective to determine an amount of braking torque just insufficient to stop the excessively spinning wheel and, if spin-out occurs after an initial stopping of the spinning wheel, to initially rapidly reapply the foundation brakes associated with said excessively spinning wheel with such an amount of torque.

Although the present invention has been described with a certain degree of particularity, it is understood that the preferred embodiment is described by way of example only and that numerous modifications and rearrangements of the parts are possible without departing from the spirit and the scope of the invention as hereinafter claimed.

I claim:

1. A method for controlling a vehicular traction control system (10) of the type comprising first (28) and second (38) drive wheels driven by a common open differential (14), first (40) and second (42) foundation brakes for retarding the rotational motion of said first and second wheels, respectively, brake control means (52, 68, 44 and 46) for independently controlling the operation of said first and second foundation brakes, said control means effective to increase the braking torque of said foundation brakes at either a relatively rapid or a relatively slower rate, means (48, 50) for sensing the value of a brake control parameter indicative of the braking torque applied by said first and second brakes, and first (36) and second (38) wheel speed sensors for sensing the rotational speed or a time derivative of rotational speed of said first and second wheels, respectively, said method comprising:
   sensing that one of said first and second wheels is excessively spinning:
   applying the foundation brakes associated with said one excessively spinning wheel to substantially slow the rotation of said excessively spinning wheel;
   monitoring the rotational speed or time derivative of rotational speed of said excessively spinning wheel and the value of the brake control parameter of said foundation brake associated with said excessively spinning wheel as said foundation brake associated with said excessively spinning wheel is applied, and sensing and memorizing the value of said brake control parameter (BCP) at the time said excessively spinning wheel is caused to rotate at a rotational speed or time derivative of rotational speed less than a predetermined reference value;
   releasing the foundation brakes associated with said excessively spinning wheel, and
   if said one wheel resumes excessively spinning, reapplying the foundation brakes associated with said one wheel at said relatively rapid rate to a target valve (BCPT) of said brake control parameter indicative of braking torque, said target valve (BCPT) of said brake control parameter indicative of braking torque being less than said memorized value of said brake control parameter (BCP) at the time said excessively spinning wheel is caused to rotate at a rotational speed or time derivative of rotational speed less than a predetermined reference value.

2. The method of claim 1 further comprising increasing at said slower rate the value of the brake control parameter indicative of braking torque with which the foundation brake associated with said one wheel is reapplied after said value exceeds said target value until such time as said one wheel ceases excessively spinning.

3. The method of claims 1 or 2 wherein said target value is decreased proportional to the amount of time said brake control means cause said foundation brakes to be released.

4. The method of claims 1 or 2 further comprising decreasing the value of said target value proportional to the time required to reapply said brakes to said target braking torque.

5. A vehicular traction control system (10) of the type comprising first (28) and second (38) drive wheels driven by a common open differential (14), first (40) and second (42) foundation brakes for retarding the rotational motion of said first and second wheels, respectively, brake control means (52, 68, 44 and 46) for independently controlling the operation of said first and second foundation brakes, said control means effective to increase the braking torque of said foundation brakes at either a relatively rapid or a relatively slower rate, means (48, 50) for sensing the value of a brake control parameter indicative of the braking torque applied by said first and second brakes, and first (36) and second (38) wheel speed sensors for sensing the rotational speed or time derivative of rotational speed of said first and second wheels, respectively, said system comprising:
   means for sensing that one of said first and second wheels is excessively spinning;
   means for applying the foundation brakes associated with said excessively spinning wheel to substantially slow the rotation of said excessively spinning wheel;
   means for monitoring the rotational speed or time derivative of rotational speed of said excessively spinning wheel and the value of the brake control parameter of said foundation brake associated with said excessively spinning wheel as said foundation brake associated with said excessively spinning wheel is applied, and means for sensing and memorizing the value of said brake control parameter (BCP) at the time said excessively spinning wheel is caused to rotate at a rotational speed or time derivative of rotational speed less than a predetermined reference value;
   means for releasing the foundation brakes associated with said excessively spinning wheel; and
   means effective if said one wheel resumes excessively spinning for reapplying the foundation brakes associated with said one wheel at said relatively rapid rate to a target value (BCPT) of said brake control parameter indicative of braking torque, said target value (BCPT) of said brake control parameter indicative of braking torque being less than said memorized value of said brake control parameter (BCP) at the time said excessively spinning wheel is caused to rotate at a rotational speed or time derivative of rotational speed less than a predetermined reference value.

* * * * *